(12) United States Patent
Phillips et al.

(10) Patent No.: US 11,868,953 B2
(45) Date of Patent: *Jan. 9, 2024

(54) FACILITATING DELIVERY OF A PRODUCT

(71) Applicant: Capital One Services, LLC, McLean, VA (US)

(72) Inventors: Jeremy Phillips, Brooklyn, NY (US); Jeff Pharr, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 1098 days.

This patent is subject to a terminal disclaimer.

(21) Appl. No.: 16/676,695

(22) Filed: Nov. 7, 2019

(65) Prior Publication Data

US 2020/0074400 A1    Mar. 5, 2020

Related U.S. Application Data

(63) Continuation of application No. 15/962,864, filed on Apr. 25, 2018, now Pat. No. 10,474,986.

(51) Int. Cl.
G06Q 10/0836 (2023.01)
G06K 19/06 (2006.01)

(52) U.S. Cl.
CPC ... *G06Q 10/0836* (2013.01); *G06K 19/06028* (2013.01); *G06K 19/06037* (2013.01)

(58) Field of Classification Search
CPC ....... G06K 19/06028; G06K 19/06037; G06Q 10/0836
USPC ...................................................... 235/381
See application file for complete search history.

(56) References Cited

U.S. PATENT DOCUMENTS

| 7,249,344 | B1 | 7/2007 | Zeanah et al. |
| 7,502,752 | B1 | 3/2009 | Lemons et al. |
| 8,632,000 | B2 | 1/2014 | Laracey et al. |
| 9,699,606 | B1* | 7/2017 | Bhatia .................. G06Q 10/083 |
| 10,474,986 | B1* | 11/2019 | Phillips ............ G06K 19/06028 |
| 2012/0173448 | A1* | 7/2012 | Rademaker .......... G06Q 10/083 |
| | | | 705/338 |

(Continued)

OTHER PUBLICATIONS

Capital One, "Grab Cash at the ATM—using Only your phone," https://www.capitalone.com/local/cashtapp-atm, 2018, 5 pages.

(Continued)

*Primary Examiner* — Paultep Savusdiphol
(74) *Attorney, Agent, or Firm* — Harrity & Harrity, LLP

(57) ABSTRACT

A device may receive a request for a product from a first user device and may generate first verification information based on the request. The device may provide the first verification information to a second user device and may provide first information associated with the product to the second user device, where the first information includes location information corresponding to a pick-up location and a drop-off location. The device may provide second information associated with the product to a product delivery device to permit the product delivery device to authenticate the second user device. The device may receive a verification request from the first user device based on an interaction and may generate second verification information. The device may provide the second verification information to the first user device to permit the second user device to verify the first user device for delivery of the product.

20 Claims, 10 Drawing Sheets

(56) References Cited

U.S. PATENT DOCUMENTS

| | | | |
|---|---|---|---|
| 2012/0246077 A1* | 9/2012 | Skaaksrud | G06Q 30/0615 |
| | | | 705/50 |
| 2012/0265809 A1 | 10/2012 | Hanson et al. | |
| 2013/0029685 A1 | 1/2013 | Moshfeghi et al. | |
| 2014/0180914 A1 | 6/2014 | Abhyanker et al. | |
| 2015/0106275 A1 | 4/2015 | Wolfs et al. | |
| 2015/0178677 A1* | 6/2015 | Strand | G06Q 10/087 |
| | | | 705/28 |
| 2016/0048796 A1* | 2/2016 | Todasco | H04W 12/06 |
| | | | 705/330 |
| 2018/0225781 A1 | 8/2018 | Obeidat et al. | |

OTHER PUBLICATIONS

Ha A., et al., "I Just Used Nimbl to Get 40 Bucks Delivered to the AOL Office," https://techcrunch.com/2014/10/03/nimbl-is-uber-for-cash/, Oct. 3, 2014, 9 pages.

Khan V., "4 Card less Ways of Withdrawing Cash from ATMs," https://gomedici.com/4-cardless-ways-withdrawing-cash-atms/, Oct. 27, 2013, 5 pages.

Travis Wagner., "The Pizza ATM: Gimmick or marketing genius?," 2016, 5 pages. Retrieved from internet: [URL: https://web.archive.org/web/20160227104631 /https://www.pizzamarketplace.com/articles/the-pizza-atm-gimmick-or-marketing-genius/].

* cited by examiner

FACILITATING DELIVERY OF A PRODUCT

RELATED APPLICATION

This application is a continuation of U.S. patent application Ser. No. 15/962,864, filed Apr. 25, 2018 (now U.S. Pat. No. 10,474,986), which is incorporated herein by reference.

BACKGROUND

People may order a product from a retail outlet. In some instances, ordering a product may involve a requestor interacting with a retail outlet representative to obtain the product. In some instances, ordering a product may involve a requestor interacting with a retail outlet representative and arranging for delivery of the product to a particular location at a particular time by a service agent.

SUMMARY

According to some possible implementations, a device may include one or more memories, and one or more processors, operatively coupled to the one or more memories, to receive a request for a product from a first user device and generate first verification information based on the request. The one or more processors may provide the first verification information to a second user device and provide first information associated with the product to the second user device, where the first information may include location information corresponding to a pick-up location at which the product is to be acquired and a drop-off location at which the product is to be delivered. The one or more processors may provide second information associated with the product to a product delivery device to permit the product delivery device to authenticate the second user device before release of the product by the product delivery device. The one or more processors may receive a verification request from the first user device based on an interaction between the first user device and the second user device at the drop-off location and generate second verification information based on the verification request. The one or more processors may provide the second verification information to the first user device to permit the second user device to verify the first user device for delivery of the product.

According to some possible implementations, a non-transitory computer-readable medium may store instructions that comprise one or more instructions that, when executed by one or more processors, cause the one or more processors to receive a request for a product from a first user device and generate first verification information based on the request. The one or more instructions, when executed by the one or more processors, may cause the one or more processors to provide the first verification information to a second user device and provide first information associated with the product to the second user device, where the first information may include location information corresponding to a pick-up location at which the product is to be acquired and a drop-off location at which the product is to be delivered. The one or more instructions, when executed by the one or more processors, may cause the one or more processors to provide second information associated with the product to a product delivery device to permit the product delivery device to authenticate the second user device before release of the product by the product delivery device, and receive a verification request from the first user device based on an interaction between the first user device and the second user device at the drop-off location. The one or more instructions, when executed by the one or more processors, may cause the one or more processors to generate a verification token based on the verification request and provide the verification token to the first user device to permit the second user device to verify the first user device, based on obtaining the verification token from the first user device, for delivery of the product.

According to some possible implementations, a method may include receiving, by a server device, a request for a product from a first user device, and generating, by the server device, first verification information based on the request. The method may include providing, by the server device, the first verification information to a second user device, and providing, by the server device, first information associated with the product to the second user device, where the first information includes location information corresponding to a product location at which the product is to be acquired. The method may include providing, by the server device, second information associated with the product to a product delivery device to permit the product delivery device to authenticate the second user device before release of the product by the product delivery device. The method may include receiving, by the server device, third information from the product delivery device regarding authentication of the second user device and release of the product by the product delivery device. The method may include providing, by the server device, fourth information to the first user device and the second user device, where the fourth information includes location information corresponding to a drop-off location at which the product is to be delivered. The method may include receiving, by the server device, a first verification request from the first user device based on an interaction between the first user device and the second user device at the drop-off location. The method may include receiving, by the server device, a second verification request from the second user device based on the interaction between the first user device and the second user device at the drop-off location. The method may include providing, by the server device, a first verification signal to the first user device and a second verification signal to the second user device to permit delivery of the product.

DETAILED DESCRIPTION

Figure 1A:
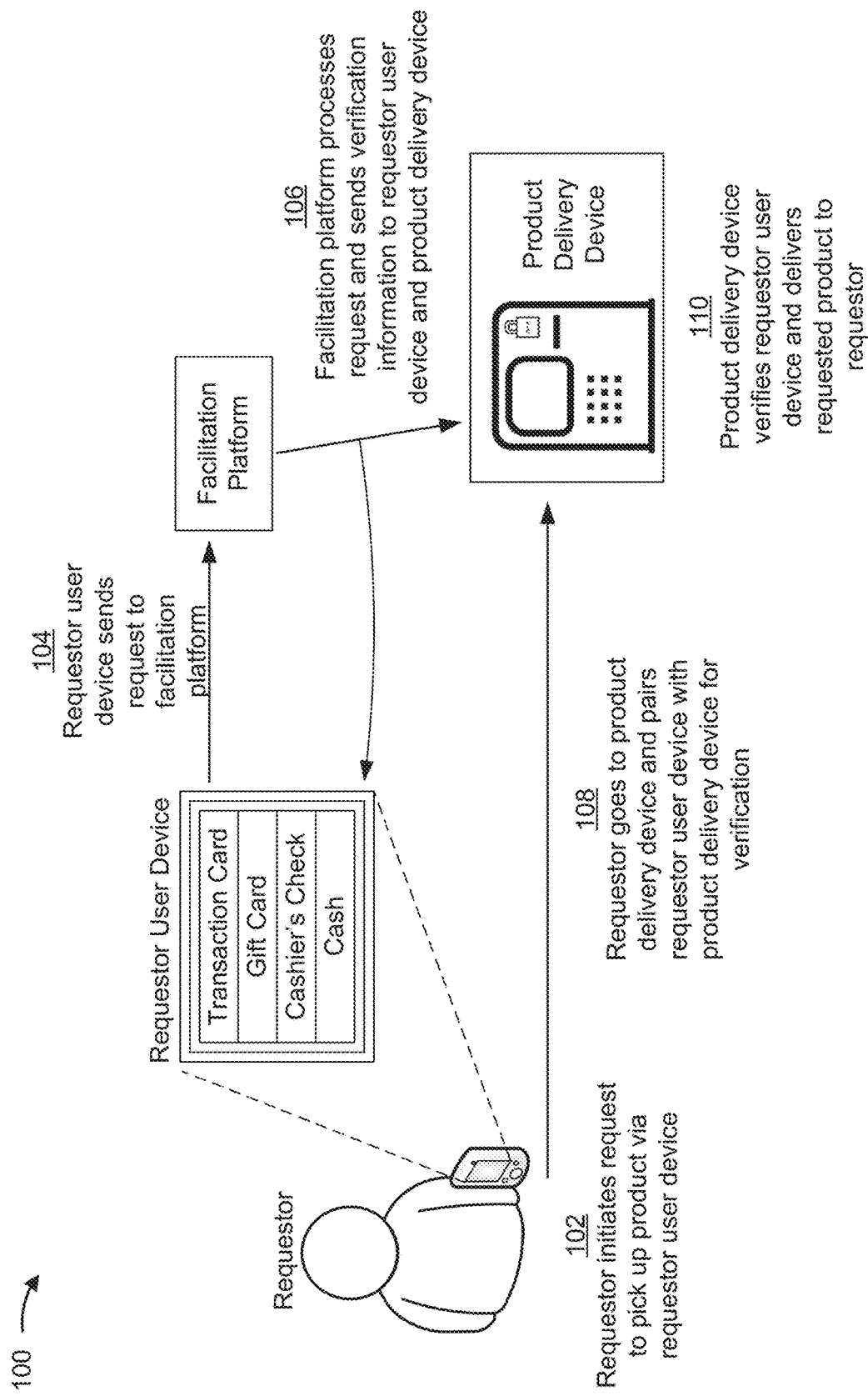
FIGS. 1A-1D are diagrams of an example implementation described herein.

The following detailed description of example implementations refers to the accompanying drawings. The same reference numbers in different drawings may identify the same or similar elements.

Generally, a requestor (e.g., a consumer) may order a security-sensitive product at a retail location. However, ordering such a product requires that the requestor go to the retail location and wait a period of time for order processing and product creation. For example, the requestor may need to go to a retail location where the product is sold, order the product, present identification and/or account information, wait for an authorization process, and/or wait for the product to be prepared, unlocked, and released. This is an inefficient use of the requestor's time. Also, the transaction is inherently unsecure because the requestor must communicate confidential information regarding the product or order to a sales agent in an open, public space.

Some implementations, described herein, provide a facilitation platform that is capable of receiving and processing product orders and enabling delivery of the product in a time-efficient and secure manner. For example, the requestor may order a product via a requestor user device and the facilitation platform may process the order, determine a pick-up location, and ensure that the requestor is able to securely acquire the product at a product delivery device. In another example, a requestor, via a requestor user device, may order a product and specify that the product is to be delivered to the requestor. The facilitation platform may process the order, enlist a service agent, determine a pick-up location, and ensure the service agent is able to acquire the product at a secure product delivery device. The facilitation platform also may determine a drop-off location, provide for the service agent and requestor to use user devices to authenticate each other, and ensure that the requestor is able to acquire the product from the service agent.

In this way, the requestor has a better user experience. The requestor orders a product on-demand and receives the product in a manner and at a time that is convenient for the requestor. The requestor feels at ease knowing that the product was securely ordered, and security measures were used to ensure delivery of the product to the requestor.

In addition, in this way, several different stages of the process for facilitating delivery of a product are automated, which may remove human subjectivity and waste from the process, and which may improve speed and efficiency of the process and conserve computing resources (e.g., processor resources, memory resources, and/or the like). Furthermore, some implementations described herein use a rigorous, computerized process to perform tasks or roles that were not previously performed or were previously performed using subjective human intuition or input. Further, the facilitation platform can ensure that product ordering, authentication, creation, and delivery resources are optimized to eliminate waste and provide more efficiency. For example, currently no automated process exists to facilitate all phases of ordering, authenticating, creating, and delivering a security-sensitive product. Further, automating the facilitating process conserves computing resources (e.g., processor resources, memory resources, and/or the like) that would otherwise be wasted performing an inefficient and/or time consuming manually driven process.

FIGS. 1A-1D are diagrams of an example implementation 100 described herein. As shown in FIG. 1A, example implementation 100 includes a requestor, a requestor user device, a facilitation platform, and a product delivery device. FIG. 1A depicts an example situation where a requestor may use a requestor user device to order a product. The requestor may request to pick up the product at a product delivery device (e.g., a locker, a lock box, an automated teller machine (ATM), a kiosk, a safe, and/or the like). The facilitation platform may process the requestor's request and ensure that the requestor is able to pick up the product at the product delivery device.

In some implementations, the product may include a physical product, such as a transaction card, a gift card, a cashier's check, cash, and/or the like. In some implementations, the requestor may be a consumer that orders such a product, like an individual or representative of a company. In some implementations, the requestor user device, through a graphical user interface (GUI), may present multiple options to the requestor to order the product, such as an option to select the product, an option to enter account and/or authorization information, an option to select the product delivery device or a pick-up location, and/or the like.

In some implementations, the facilitation platform may include a cloud computing platform, a group of server devices, and/or the like. In some implementations, the product delivery device may include a locker, a lock box, an automated teller machine (ATM), a kiosk, a safe, a vending machine, or another type of secured location for housing and releasing the product. The product delivery device may have the capability to create the product on demand (e.g., create a cashier's check for a specific amount to a specific payee). In some implementations, the product delivery device may include security and/or authentication features for authenticating the requestor when picking up the product. For example, the security and/or authentication features may include requiring entry of a password, or pairing with the requestor user device to provide wireless authentication (e.g., through near field communication ("NFC"), radio-frequency identification ("RFID"), Bluetooth, text messaging, and/or the like).

As further shown in FIG. 1A, and by reference number 102, the requestor may initiate, via the requestor user device, a request to pick up a product (e.g., a transaction card, a gift card, a cashier's check, cash, and/or the like). In some implementations, the request may include a plurality of information, including a product identification, an amount (e.g., a monetary amount associated with the product), an item of account-related information, a requestor's identity and/or item of identity-related information, information associated with a location of the requestor, information associated with a pick-up location, a creation time, a pick-up time, a product availability time, a security credential, a security token (e.g., with limited access or access for a limited time), a username, a password, and/or the like. In some implementations, the request may be implemented via a computer program, an application, a text message, an input to a webpage, and/or the like. As further shown in FIG. 1A, and by reference number 104, the requestor user device may send the request to the facilitation platform. In some implementations, the requestor user device and the facilitation platform may communicate via a direct connection, through a wired network, through a wireless network, and/or the like.

As further shown in FIG. 1A, and by reference number 106, the facilitation platform may process the request. In some implementations, the facilitation platform may process the request by verifying that the request includes account information and that the account information is valid. In some implementations, the facilitation platform may process the request by verifying the requestor's identity, which may comprise comparing the requestor's identity and/or item of identity-related information, which may include the requestor's name, address, account information, driver's license information, Social Security number, and/or the like, and identification information that is associated with the requestor's account. In some implementations, the facilitation platform may process the request by verifying that the requestor's account has enough money available to create the product by comparing the amount specified in the request with the available balance in the account. In some implementations, the facilitation platform may process the request by evaluating one or more items of the request's plurality of information to determine whether to permit the requestor to obtain the product.

In this way, the facilitation platform may provide an improved user experience for ordering a product. For example, the facilitation platform may provide, via the requestor's user device, a personalized and secure interface for ordering a product on-demand and in a location that is convenient to the requestor. In some implementations, the facilitation platform may allow scheduling of hundreds, thousands, millions, etc., of orders from hundreds thousands, millions, etc., of requestors. Thus, the facilitation platform may manage a volume of data that cannot be processed objectively by a human actor.

In some implementations, the facilitation platform may process the request by selecting the product delivery device that will create and release the product to the requestor. For example, the facilitation platform may select the product delivery device based on one or more factors, such as a location associated with the requestor and a location associated with the product delivery device. For example, the facilitation platform may select a product delivery device based on which product delivery device is closest to the current location of the requestor or which product delivery device is closest to a future location of the requestor. In some implementations, and with the requestor's permission, the facilitation platform may access information on the requestor user device, like the requestor's emails, texts, calendars, messages, and/or the like to determine a likely future location of the requestor and select a product delivery device that is at or near the future location. In some implementations, the facilitation platform may select the product delivery device closest to a pick-up location specified by the requestor.

In this way, the facilitation platform may provide a selection of a product delivery device in a way that is more efficient than other selection methods in that the facilitation platform's selection method may lead to faster product fulfillment for an entity that prepares and provides the product to customers.

In some implementations, the facilitation platform may consider other factors of the one or more factors to select a product delivery device, such as, weather conditions (e.g., whether the weather may affect the requestor's ability to travel to the product delivery device, whether the weather may make an indoor or outdoor product delivery device more preferable to the requestor, whether moisture may compromise the integrity of the product, and/or the like), traffic conditions (e.g., whether traffic may make the travel time to the location of one product delivery device less than the travel time to the location of another, whether road closures make a product delivery device inaccessible, whether one route has tolls and another does not, and/or the like), an affiliation of the product delivery device with a particular retail outlet (e.g., whether the requestor may be subject to additional fees for using a particular product delivery device, whether the requestor may be subject to an alternative authentication processes for using a differently affiliated product delivery device, whether scheduling for pick-up of the product may be delayed and/or the like), and/or the like.

In some implementations, the facilitation platform may consider additional factors of the one or more factors to select the product delivery device. In some implementations, the facilitation platform may assess the capabilities or characteristics of a plurality of product delivery devices. For example, the facilitation platform may evaluate each product delivery device's capability to: create the product (e.g., whether the product delivery device has authority, time (e.g. whether the product delivery device can create the product in a timely manner based on other requests in the product delivery device's queue of requests), resources (e.g., whether the product delivery device has the right type of physical materials to create the product, like plastic for a transaction card or check paper for a cashier's check), access, and/or the like to create the product), secure the product (e.g., whether the product delivery device has the necessary equipment to verify or authorize the requestor, whether the product delivery device is hooked up to a network to communicate with the facilitation platform, whether the product delivery device is in a secure location like a bank branch office or in an unsecure location like a parking lot, whether the product delivery device is located in a crowded area or remote area, and/or the like), make the product available (e.g., whether the product delivery device is open or operating at the time product delivery is requested, how long the product delivery device will hold the product before destroying or invalidating the product, whether the product delivery device has space to hold the product, and/or the like), and/or the like.

In this way, the facilitation platform may provide an improved user experience for selecting a product delivery device. For example, the facilitation platform may provide, via the requestor's user device, a map or list that indicates the product delivery device that will provide the most convenient and efficient delivery experience to the requestor.

In some implementations, the facilitation platform may utilize a machine learning or artificial intelligence model to select the product delivery device. For example, based on the model, the facilitation platform may weight the one or more factors, discussed above, to select the product delivery device. In some implementations, the facilitation platform may train the model based on an artificial intelligence approach, such as a machine learning algorithm, a neural network algorithm, or another type of artificial intelligence approach. To train the model based on the artificial intelligence approach, the facilitation platform may use a training set of known inputs (e.g., the one or more factors) and known outputs corresponding to the inputs (e.g., scores for product delivery devices). For example, the facilitation platform may train the model based on a training set of data that includes a set of past requests and a set of optimal product delivery device selections, where each past request corresponds to an optimal product delivery device selection.

In some implementations, the artificial intelligence approach may identify relationships between the known inputs and the known outputs, and may configure parameters corresponding to the relationships. For example, the model may process the training set of data and create general rules for selecting a product delivery device based on a request. In some implementations, the model may be used to assign scores to product delivery devices based on a likelihood that the product delivery devices would help provide an optimal delivery experience.

In some implementations, the facilitation platform may update the model based on the artificial intelligence approach. For example, the facilitation platform may use a testing set of known inputs (e.g., the one or more factors)

and target outputs corresponding to the known inputs (e.g., scores for product delivery devices). The target outputs may be outputs that are known to be correct or that are associated with positive feedback (e.g., indicating that the target output is correctly associated with the corresponding known inputs). The facilitation platform may input, to the model, the known inputs of the testing set, and the model may output observed outputs. The facilitation platform may compare the target outputs and the observed outputs, and may reconfigure the parameters of the model based on the artificial intelligence algorithm. In this way, the facilitation platform improves accuracy of the model based on iteratively improving accuracy of parameters of the model.

In some implementations, the facilitation platform may use the trained and tested model to select one or more product delivery devices. For example, the facilitation platform may identify the one or more factors particular to the request and use the one or more factors as inputs to the model. The model may then output information identifying one or more product delivery devices, possibly with corresponding scores for the one or more product delivery devices. In some implementations, the facilitation platform may select one of the one or more product delivery devices based on the scores. In some implementations, the facilitation platform may solicit feedback, such as from the requestor, as to which of the one or more product delivery devices to select.

In this way, the facilitation platform delivers an optimized product delivery device selection process that conserves computing resources (e.g., processor resources, memory resources, and/or the like), which would otherwise be wasted performing an inefficient and/or time consuming process.

As further shown by reference number 106 in FIG. 1A, the facilitation platform may send verification information to the requestor user device and to the product delivery device. In some implementations, the verification information may include a password, a personal identification number ("PIN"), a quick response ("QR") code, a bar code, an identification string, a security identification feature, an item of authentication information concerning the requestor, an authentication credential for release of the product, an item of information concerning the requestor user device, information identifying a location of the requestor, information identifying a location of the product delivery device, an item of information concerning a route from a location of the requestor to the product delivery device, a time of availability concerning the product, a time of operation concerning the product delivery device, and/or the like.

As further shown in FIG. 1A, and by reference number 108, the requestor may go to the product delivery device and may pair the requestor user device with the product delivery device for verification. In some implementations, the requestor user device may pair with the product delivery device via a wireless communication (e.g., through NFC, RFID, Bluetooth, text messaging, and/or the like). In some implementations, to facilitate pairing, the requestor user device and product delivery device may share one or more transaction tokens (e.g., a quick response (QR) code or bar code), and/or the like. In some implementations, the requestor may enter a code on the requestor user device and/or on the product delivery device to start or facilitate the pairing process.

As shown by reference number 110, the product delivery device may verify the requestor user device and deliver the requested product to the requestor. In some implementations, the verification process may be done locally at the product delivery device. In some implementations, the verification process may include communicating information between the product delivery device and the requestor user device. For example, the product delivery device may verify the requestor user device by evaluating the item of authentication information concerning the requestor (that the product delivery device received in the verification information sent from the facilitation platform) in view of the authentication credential for release of the product, which the product delivery device received from the requestor user device while communicating information with the requestor user device.

In some implementations, the verification process may include the product delivery device communicating with the facilitation platform to assist in verifying the requestor user device. For example, the product delivery device may send a message to the facilitation platform asking that the facilitation platform verify the requestor user device based on the information received from the requestor user device during pairing. In some implementations, the facilitation platform may verify the requestor user device and send a message to the product delivery device that confirms verification of the requestor user device.

In some implementations, the product delivery device may deliver the requested product to the requestor. In some implementations, the product delivery device may unlock a door, drawer, box, and/or the like and allow the requestor to obtain the product. In some implementations, the product delivery device may be an ATM that includes a slot that dispenses the product for delivery. In some implementations, the product delivery device may include a secure locker that unlocks a door so that the requestor can open the door and obtain the product. In some implementations, the product delivery device may be a vending machine that deposits the product in a trough that allows the requestor to obtain the product.

Figure 1B:
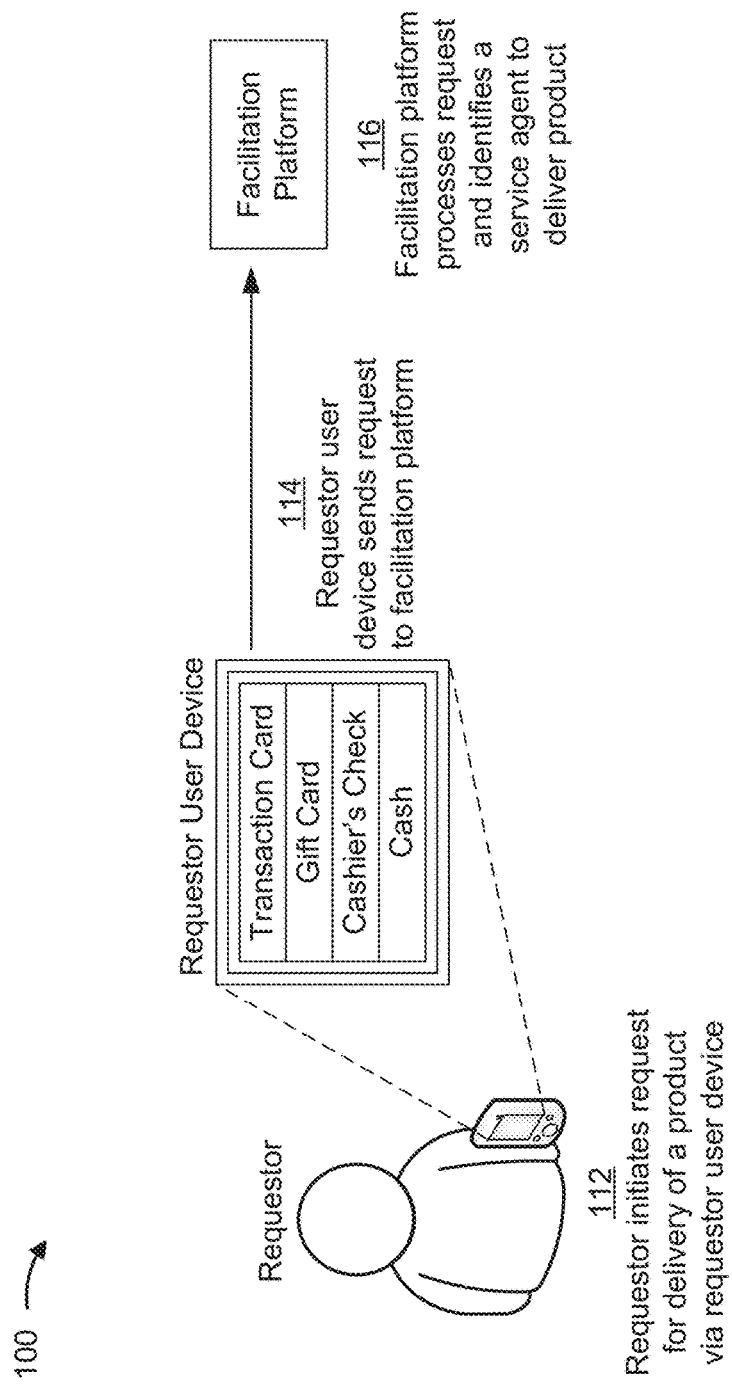
Figure 1C:
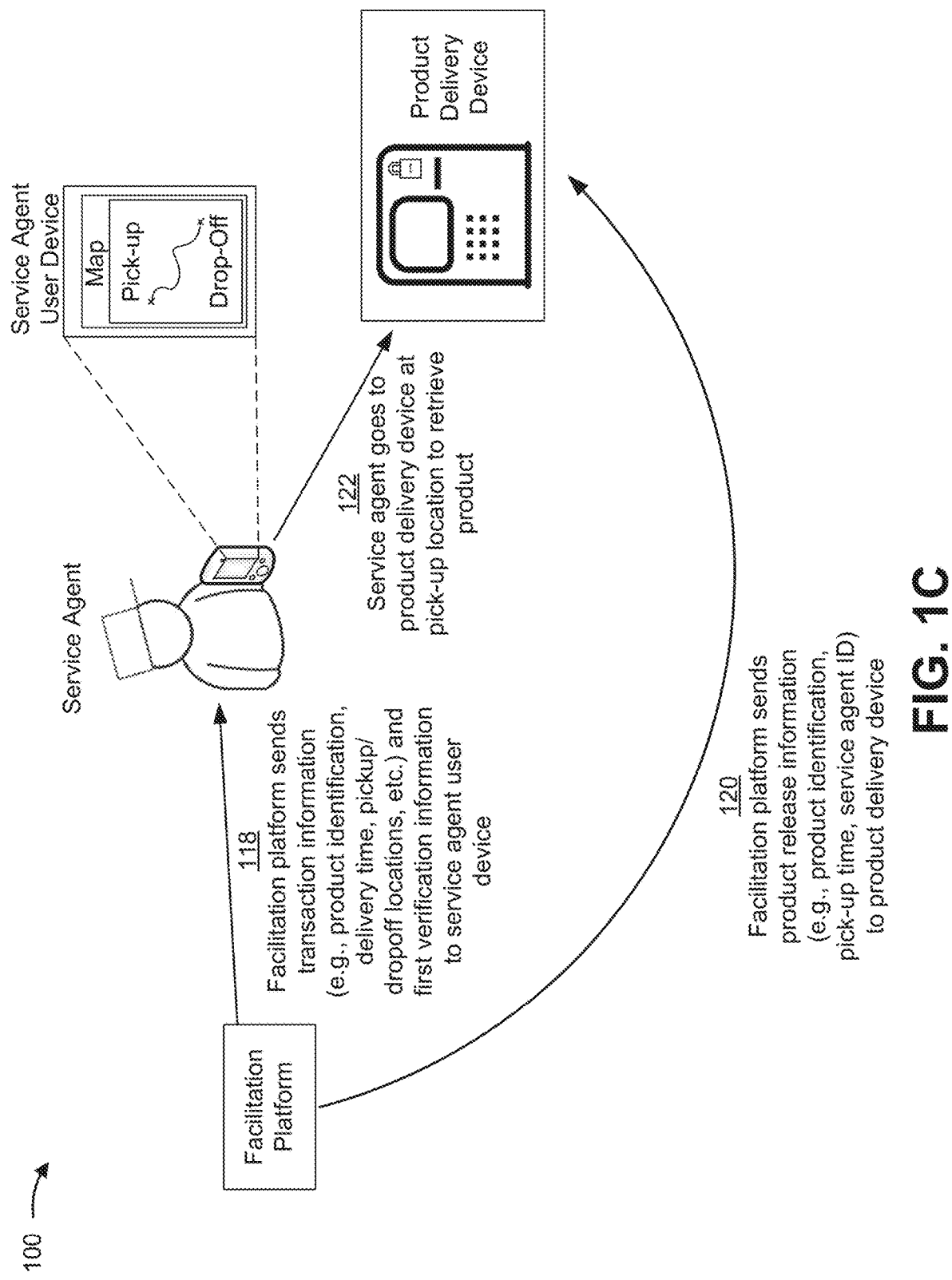
Figure 1D:
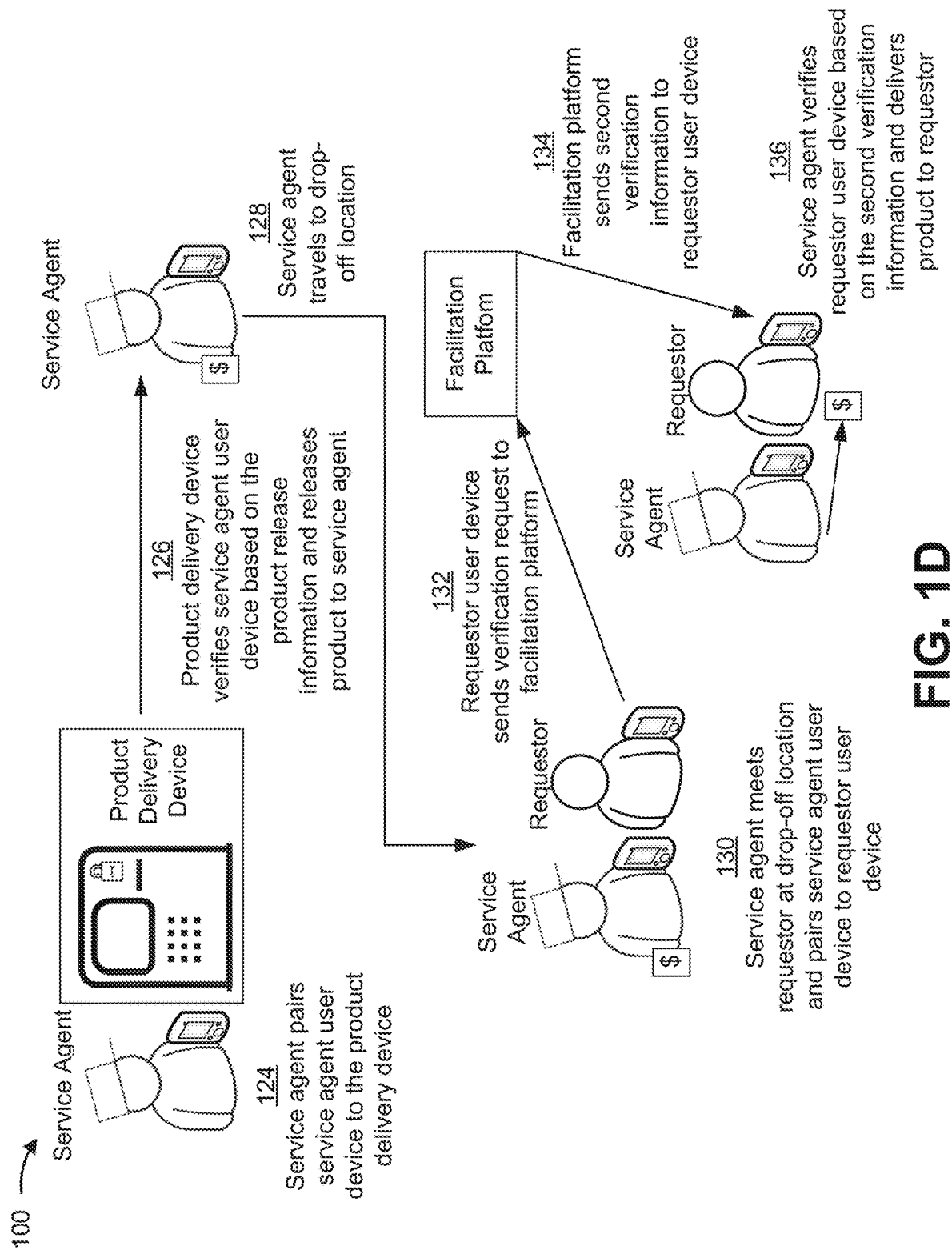

FIGS. 1B-1D depict an example situation where a requestor orders a product (e.g., a transaction card, a gift card, a cashier's check, cash, and/or the like) and requests delivery of the product. A service agent (e.g., a courier, drone, robot, autonomous delivery device, and/or the like) picks up the product at a product delivery device (e.g., a locker, a lock box, an ATM, a kiosk, a safe, and/or the like) and delivers the product to the requestor. A facilitation platform processes the requestor's request, ensures that the service agent is able to pick up the product at the product delivery device, and provides for the service agent to deliver the product to the requestor.

As shown in FIG. 1B, and by reference number 112, the requestor (e.g., the customer ordering the product) may initiate a request for delivery of a product via a requestor user device. In some implementations, the request may include a plurality of information, including a product identification, an amount (e.g., a monetary amount associated with the product), an item of account-related information, a requestor's identity and/or item of identity-related information, a delivery type, information identifying a location of the requestor, information identifying a delivery location, a product delivery time, a security credential, a security token (e.g., with limited access or access for a limited time), a username, a password, and/or the like. In some implementations, the request may be implemented via a computer program, an application, a text message, an input to a webpage, and/or the like. As shown by reference number 114, the requestor user device may send the request to the facilitation platform. In some implementations, the requestor user device and the facilitation platform may communicate via a direct connection, through a wired network, through a wireless network, and/or the like.

As shown by reference number 116, the facilitation platform may process the request. In some implementations, the facilitation platform may process the request by verifying that the request includes account information and that the account information is valid. In some implementations, the facilitation platform may process the request by verifying the requestor's identity, which may comprise comparing the requestor's identity and/or item of identity-related information, which may include the requestor's name, address, account information, driver's license information, Social Security number, and/or the like, and identification information that is associated with the requestor's account. In some implementations, the facilitation platform may process the request by verifying that the requestor's account has enough money available to create the product by comparing the amount specified in the request with the available balance in the account. In some implementations, the facilitation platform may process the request by evaluating one or more items of the request's plurality of information to determine whether to permit the requestor to obtain the product.

In this way, the facilitation platform may provide an improved user experience for ordering delivery of a product. For example, the facilitation platform may provide, via the requestor's user device, a personalized and secure interface for ordering delivery of a product on-demand and in a location that is convenient to the requestor. In some implementations, the facilitation platform may allow scheduling of hundreds, thousands, millions, etc., of orders from hundreds thousands, millions, etc., of requestors.

In some implementations, the facilitation platform may process the request by selecting the product delivery device that will create and release the product to the service agent. For example, the facilitation platform may select the product delivery device based on one or more factors, such as a location associated with the requestor and a location associated with the product delivery device. For example, the facilitation platform may select the product delivery device based on which product delivery device is closest to the current location of the requestor or which product delivery device is closest to a future location of the requestor. In some implementations, the facilitation platform may select the product delivery device based on which product delivery device is closest to the current location of the service agent. In some implementations, the facilitation platform may access information on the requestor user device, like the requestor's emails, texts, calendar, messages, and/or the like to determine a likely future location of the requestor and select a nearby product delivery device. In some implementations, the facilitation platform may select the product delivery device closest to a delivery location specified in the request. In some implementations, the facilitation platform may select the product delivery device based on calculating the shortest and/or quickest route from the current location of the service agent to the delivery location specified in the request.

In this way, the facilitation platform may provide a selection of a product delivery device in a way that is more efficient than other selection methods in that the facilitation platform's selection method may lead to faster product fulfillment and lower costs for an entity that prepares and provides the product to customers. For example, an entity that employs a service agent is able to optimize the service agent's route and delivery jobs to maximize the number of deliveries and minimize delivery-associated costs, such as fuel consumption, vehicle wear-and-tear, and/or the like.

In some implementations, the facilitation platform may consider other factors to select a product delivery device, such as, weather conditions (e.g. whether the weather may affect the service agent's ability to travel to the product delivery device, whether the weather may make an indoor or outdoor product delivery device more preferable to the requestor, whether moisture may compromise the integrity of the product, and/or the like), traffic conditions (e.g., whether traffic conditions may make the total travel time for pick-up and delivery of the product on one route less than the total travel time for pick-up and delivery of the product on another route, whether road closures make a product delivery device inaccessible, whether one route has tolls and the other does not, and/or the like), an affiliation of the product delivery device with a particular retail outlet (e.g., whether the requestor may be subject to additional fees for using a particular product delivery device, whether the requestor may be subject to an alternative authentication processes for using a differently affiliated product delivery device, whether scheduling the delivery of the product may be delayed, and/or the like), and/or the like.

In some implementations, the facilitation platform may select the product delivery device by assessing the capabilities or characteristics of a plurality of product delivery devices. For example, the facilitation platform may evaluate each product delivery device's capability to: create the product (e.g., whether the product delivery device has authority, time, resources, access, and/or the like to create the product), secure the product (e.g., whether the product delivery device has the necessary equipment to verify or authorize the service agent, whether the product delivery device is hooked up to a network to communicate with the facilitation platform, whether the product delivery device is in a secure location like a bank branch office or in a unsecure location like a parking lot, whether the product delivery device is located in a crowded area or remote area, and/or the like), make the product available (e.g., whether the product delivery device is open or operating at the time product delivery is requested, how long the product delivery device will hold the product before destroying or invalidating the product, whether the product delivery device has space to hold the product, and/or the like), and/or the like.

In some implementations, the facilitation platform may utilize a machine learning or artificial intelligence model to select the product delivery device. For example, based on the model, the facilitation platform may weight the one or more factors, discussed above, to select the product delivery device. In some implementations, the facilitation platform may train the model based on an artificial intelligence approach, such as a machine learning algorithm, a neural network algorithm, or another type of artificial intelligence approach. To train the model based on the artificial intelligence approach, the facilitation platform may use a training set of known inputs (e.g., the one or more factors) and known outputs corresponding to the inputs (e.g., scores for product delivery devices). For example, the facilitation platform may train the model based on a training set of data that includes a set of past requests and a set of optimal product delivery device selections, where each past request corresponds to an optimal product delivery device selection.

In some implementations, the artificial intelligence approach may identify relationships between the known inputs and the known outputs, and may configure parameters corresponding to the relationships. For example, the model may process the training set of data and create general rules for selecting a product delivery device based on a request. In some implementations, the model may be used to assign scores to product delivery devices based on a likelihood that the product delivery devices would help provide an optimal delivery experience.

In some implementations, the facilitation platform may update the model based on the artificial intelligence approach. For example, the facilitation platform may use a testing set of known inputs (e.g., the one or more factors) and target outputs corresponding to the known inputs (scores for product delivery devices). The target outputs may be outputs that are known to be correct or that are associated with positive feedback (e.g., indicating that the target output is correctly associated with the corresponding known inputs). The facilitation platform may input, to the model, the known inputs of the testing set, and the model may output observed outputs. The facilitation platform may compare the target outputs and the observed outputs, and may reconfigure the parameters of the model based on the artificial intelligence algorithm. In this way, the facilitation platform improves accuracy of the model based on iteratively improving accuracy of parameters of the model.

In some implementations, the facilitation platform may use the trained and tested model to select one or more product delivery devices. For example, the facilitation platform may identify the one or more factors particular to the request and use the one or more factors as inputs to the model. The model may then output information identifying one or more product delivery devices, possibly with corresponding scores for the one or more product delivery devices. In some implementations, the facilitation platform may select one of the one or more product delivery devices based on the scores. In some implementations, the facilitation platform may solicit feedback, such as from the requestor, as to which of the one or more product delivery devices to select.

In this way, the facilitation platform delivers an optimized product delivery device selection process that conserves computing resources (e.g., processor resources, memory resources, and/or the like), which would otherwise be wasted performing an inefficient and/or time consuming process.

As further shown by reference number 116 in FIG. 1B, the facilitation platform may identify a service agent to deliver the product. In some implementations, the service agent is a carrier, courier, postal worker, and/or the like. In some implementations, the service agent is a robot, drone, autonomous delivery device, and/or the like. In some implementations, the service agent is associated with a service agent user device. In some implementations, the service agent user device is a communication and/or computing device, such as a mobile phone, a laptop computer, a tablet computer, and/or the like. In some implementations, where the service agent is a robot, drone, autonomous delivery device, and/or the like, the service agent user device may be connected, embedded, integrated, and/or the like with the service agent.

In some implementations, the facilitation platform may select the service agent based on characteristics of the service agent and/or the service agent user device (which may be representative of characteristics of the service agent associated with the service agent user device). For example, such characteristics of the service agent user device may include a location of the service agent user device, an ability to deliver the product (e.g., whether the service agent associated with the service agent user device is experienced, licensed, or registered to deliver the product), a rating associated with the service agent user device (e.g., indicating a quality and/or trustworthiness level associated with the service agent of the service agent user device), a schedule or availability associated with the service agent user device to deliver the product at a time indicated in the request, and/or the like. For example, the facilitation platform may select a service agent based on whether the service agent is available and/or authorized to perform delivery of the product, the service agent is within a threshold proximity of a location of the requestor device, the delivery location, and/or a location of the product delivery device.

In some implementations, the facilitation platform may use may utilize a machine learning or artificial intelligence model to select the service agent. For example, based on the model, the facilitation platform may weight the characteristics of the service agent and/or the service agent user device, discussed above, to select the product delivery device. In some implementations, the facilitation platform may train the model based on an artificial intelligence approach, such as a machine learning algorithm, a neural network algorithm, or another type of artificial intelligence approach. To train the model based on the artificial intelligence approach, the facilitation platform may use a training set of known inputs (e.g., the characteristics) and known outputs corresponding to the inputs (e.g., scores for service agents and/or service agent devices). For example, the facilitation platform may train the model based on a training set of data that includes a set of information concerning service agents, a corresponding set of service agent ratings by requestors that have been delivered products by the service agents, and a set of optimal service agent selections.

In some implementations, the artificial intelligence approach may identify relationships between the known inputs and the known outputs, and may configure parameters corresponding to the relationships. For example, the model may process the training set of data and create rules for selecting a service agent. In some implementations, the model may be used to assign scores to service agents based on a likelihood that the service agent would provide an optimal delivery experience.

In some implementations, the facilitation platform may update the model based on the artificial intelligence approach. For example, the facilitation platform may use a testing set of known inputs (e.g., the characteristics) and target outputs corresponding to the known inputs (e.g., scores for service agents and/or service agent devices). The target outputs may be outputs that are known to be correct or that are associated with positive feedback (e.g., indicating that the target output is correctly associated with the corresponding known inputs). The facilitation platform may input, to the model, the known inputs of the testing set, and the model may output observed outputs. The facilitation platform may compare the target outputs and the observed outputs, and may reconfigure the rules of the model based on the artificial intelligence algorithm. In this way, the facilitation platform improves accuracy of the model based on iteratively improving accuracy of parameters of the model.

In some implementations, the facilitation platform may use the trained and tested model to select one or more service agents (or service agent devices). For example, the facilitation platform may identify the characteristics particular to the request and use the characteristics as inputs to the model. The model may then output information identifying one or more product delivery devices, possibly with corresponding scores for the one or more product delivery devices. In some implementations, the facilitation platform may select one of the one or more product delivery devices based on the scores. In some implementations, the facilitation platform may solicit feedback, such as from the requestor, as to which of the one or more product delivery devices to select.

In this way, the facilitation platform delivers an optimized service agent selection process that conserves computing resources (e.g., processor resources, memory resources, and/or the like), which would otherwise be wasted performing an inefficient and/or time consuming process.

As shown in FIG. 1C, and by reference number 118, the facilitation platform may send transaction information and first verification information (e.g., information indicating approval of a service agent to pick up the product) to a service agent user device. In some implementations, the transaction information may include product identification information, product amount (if applicable), account information, information concerning a payer and/or payee (if applicable, e.g. for a cashier's check), identification of the product delivery device, information identifying the location of the product delivery device, information identifying the delivery location, requestor user device information, requestor identification information, time of creation of the product, time of expiration of the product (e.g., a transaction card expiration date), time for pick-up of the product, and/or the like. In some implementations, the first verification information may include may include a password, a PIN, a QR code, a bar code, an identification string, a security identification feature, an item of authentication information concerning the service agent, an authentication credential for release of the product, information identifying a location of the product delivery device, an item of information concerning a route from a location of the service agent to a location of the product delivery device, a time of availability concerning the product, a time of operation concerning the product delivery device, and/or the like.

In some implementations, the service agent user device may display information related to the transaction information and the first verification information. For example, the service agent user device may display a map showing a pick-up location and a drop-off location to facilitate delivery of the product. In this case, the service agent user device may display an indication of a location of the service agent relative to a location of the product delivery device and/or the delivery location, a route to the product delivery device, a route to the delivery location, and/or the like. In some implementations, the facilitation platform may provide the indication of the location of the service agent, the pick-up location, and the drop-off location to the requestor user device for display to the requestor in a similar fashion.

As shown by reference number 120, the facilitation platform may send product release information to the product delivery device. In some implementations, the product release information may include product identification information, product amount (if applicable), account information, information concerning a payer and/or payee (if applicable, e.g. for a cashier's check), time of creation of the product, time of expiration of the product (e.g., a transaction card expiration date), time for pick-up of the product, authentication information concerning the service agent, authentication credentials for release of the product, and/or the like. As shown by reference number 122, the service agent may go to the product delivery device at the pick-up location to retrieve the product.

As shown in FIG. 1D, and by reference number 124, the service agent may pair the service agent user device with the product delivery device. In some implementations, the service agent device may pair with the product delivery device via a wireless communication (e.g., through NFC, RFID, Bluetooth, text messaging, and/or the like).

In some implementations, to facilitate pairing, the requestor user device and the product delivery device may share one or more transaction tokens (e.g., a quick response (QR) code or bar code), and/or the like. In some implementations, the service agent may enter a code on the service agent user device and/or on the product delivery device to start or facilitate the pairing process.

As shown by reference number 126, the product delivery device may verify the service agent user device based on the product release information. In some implementations, the verification process may be done locally at the product delivery device. In some implementations, the verification process may include communicating information between the product delivery device and the service agent user device. For example, the product delivery device may verify the requestor user device by evaluating the item of authentication information concerning the service agent (that is part of the product release information) in view of the authentication credential for release of the product, which the product delivery device received from the service agent user device while communicating information with the service agent user device.

In some implementations, the verification process may include the product delivery device communicating with the facilitation platform to assist in verifying the requestor user device. For example, the product delivery device may send a message to the facilitation platform asking that the facilitation platform verify the service agent user device based on the information received from the service agent user device during pairing. The facilitation platform may send a message to the product delivery device confirming verification of the service agent user device. In some implementations, the service agent user device and/or the product delivery device may communicate with the facilitation platform and/or the requestor device to provide creation and/or release status of the product information (e.g., "product created and available," "product released," "product en route," "service agent verified/authenticated," and/or the like).

As further shown by reference number 126, the product delivery device may release the product to the service agent. In some implementations, the product delivery device may unlock a door, drawer, box, and/or the like and allow the service agent to obtain the product. In some implementations, the product delivery device may be an ATM that includes a slot that dispenses the product. In some implementations, the product delivery device may include a secure locker that unlocks a door so that the service agent can open the door and obtain the product. In some implementations, the product delivery device may be a vending machine that deposits the product in a trough that allows the service agent to obtain the product.

As shown by reference number 128, the service agent may travel to a drop-off location (e.g., the delivery location). In some implementations, the service agent user device may share information regarding a location of the service agent user device with the facilitation platform. In some implementations, the requestor user device may share information regarding a location of the requestor user device with the facilitation platform. In some implementations, the facilitation platform may send information to the service agent user device and/or the requestor user device to enable presentation of a map that shows the current location of the service agent user device, the requestor user device, a route from the service agent user device to the drop-off location, and/or a route from the requestor user device to the drop-off location.

In some implementations, the facilitation platform may only approximate the current location of the service agent user device and/or the requestor user device for safety purposes. For example, the facilitation platform may obscure an exact location and provide only an approximate location.

As further shown in FIG. 1D, and by reference number 130, the service agent may meet the requestor at the drop-off location and pair the service agent user device to the requestor user device. In some implementations, the requestor pairs the requestor user device to the service agent user device, or vice versa. In some implementations, the pairing is accomplished via wireless communication (e.g., through NFC, RFID, Bluetooth, text messaging, and/or the like). In some implementations, to facilitate pairing, the requestor user device and the service agent user device may share one or more transaction tokens (e.g., a quick response (QR) code or bar code), and/or the like.

In some implementations, the service agent user device and/or the requestor user device may communicate with the facilitation platform to aid in the pairing process. For example, the service agent user device and/or the requestor user device may communicate information about the pairing process to the facilitation platform to enable the facilitation platform to provide confirmation to the service agent user device and/or requestor user device that the service agent user device and requestor user device are authorized to share information.

As shown by reference number 132, the requestor user device may send a verification request to the facilitation platform. In some implementations, the verification request may include information the requestor user device received during the pairing process (e.g., service agent user device information, information concerning a service agent location and/or a service agent user device location, a security token, verification and/or authorization information, and/or the like. In some implementations, the verification request may include requestor user device information, information concerning a requestor location and/or a requestor user device location, a time, a date, and/or the like.

In some implementations, the requestor user device and the service agent user device may each send a separate verification request to the facilitation platform. The facilitation platform may then send a first verification signal, which includes information related to the service agent user device, to the requestor user device, and a second verification signal, which includes information related to the requestor user device, to the service agent user device. In some implementations, each verification signal may indicate that the requestor user device and service agent user device were successfully authenticated. In some implementations, the facilitation platform may receive an authentication signal from the requestor user device indicating that the requestor user device authenticated the service agent user device based on the information related to the service agent user device. In some implementations, the facilitation platform may receive an authentication signal from the service agent user device indicating that the service agent user device authenticated the requestor user device based on the information related to the requestor user device. The facilitation platform may then send information to the requestor user device and the service agent user device to indicate completion of delivery of the product.

As shown by reference number 134, the facilitation platform may send second verification information to the requestor user device. In some implementations, the second verification information may include service agent user device information and/or requestor user device information, requestor location information and/or service agent location information, requestor identification information and/or service agent identification information, a time and/or date, a security token, a verification token (which may include a QR code, bar code, identification string, and/or the like), verification and/or authorization information, and/or the like. In some implementations, the facilitation platform may generate the second verification information. For example, the facilitation platform may generate, based on the verification request, requestor user device information and requestor identification information that indicates the requestor user device is associated with the requestor, which can be used by the service agent user device to verify the requestor user device.

As shown by reference number 136, the service agent may verify the requestor user device based on the second verification information. In some implementations, the requestor user device may provide the second verification information to the service agent user device. The service agent user device may compare the second verification information and the first verification information and/or the transaction information to verify the requestor user device. For example, the service agent user device may compare the second verification information that includes requestor user device information and requestor identification information and the transaction information that includes requestor user device information and requestor identification information to verify the requestor user device.

As further shown by reference number 136, based on verifying the requestor user device, the service agent may deliver the product to the requestor. In some implementations, the service agent may deliver the product to the requestor by handing the product to the requestor, depositing the product into a secure receptacle (e.g. a mailbox, lockbox, and/or the like), and/or the like. In some implementations, the requestor user device may send information to the facilitation platform that indicates acceptance of the product was successful. In some implementations, the service agent user device may send information to the facilitation platform that indicates delivery of the product was successful. In some implementations, based on receiving information that indicates delivery from the requestor user device and service agent user device, the facilitation platform may send information to the requestor user device and the service agent user device to indicate completion of delivery of the product.

Other scenarios in which the above described implementations may be applicable are possible. For example, the implementations can apply to a peer-to-peer delivery scenario and/or a business-to-business delivery scenario. In this case, a requestor may use a requestor user device to order a service agent to pick up a product from the requestor and to deposit the product in a product delivery device. The requestor may initiate the order via the requestor user device where the requestor specifies the product to be deposited. In some implementations, the order may specify the product delivery device in which to deposit the product. In some implementations, the facilitation platform may process the order and may select, based on the order, the product delivery device in which the requestor is to deposit the product. In some implementations, the facilitation platform may select the service agent to pick up the product from the requestor.

In some implementations, the facilitation platform may send transaction information and verification information to a service agent user device associated with the selected service agent, where the transaction information and the verification information includes similar information as that described above. In some implementations, the facilitation platform may send product deposit information, where the product deposit information includes similar information to the product release information described above, to the product delivery device.

In some implementations, the service agent and the requestor may meet at a pick-up location and the requestor may pair the requestor user device to the service agent user device, or vice versa. In some implementations, the facilitation platform may facilitate verification of the service agent user device to the requestor user device and/or verification of the requestor user device to the service agent user device. In some implementations, based on verifying the service agent user device and/or the requestor user device, the requestor may release the product to the service agent.

In some implementations, the service agent may pair the service agent user device with the product delivery device. The product delivery device may verify the service agent user device based on the product deposit information. In some implementations, based on verifying the service agent user device, the product delivery device may unlock a door, a drawer, a box, and/or the like to permit the service agent to deposit the product in the product delivery device.

As a specific example of a peer-to-peer scenario, a service agent may pick up cash, a check, and/or the like from a requestor and then deliver the cash, the check, and/or the like to a kiosk, a bank, an ATM, a drop box, and/or the like (e.g., after pairing and/or authentication processes similar to that described elsewhere herein). As a specific example of a business-to-business scenario, the facilitation platform (e.g., on behalf of a financial institution) may identify a third party service agent that is collecting a deposit of cash, a check, and/or the like from a third party-operated ATM, deposit box, kiosk, and/or the like. This improves the process of collecting deposits from a product delivery device by improving a security of the process for collecting a deposit. While these implementations may apply to a scenario that is different than that described elsewhere herein, the implementations may be performed in a similar manner.

As another example, the implementations can apply to a kiosk delivery scenario. In this case, a requestor may deposit a product in a first product delivery device and may use a requestor user device to order a service agent to pick up the product from the product delivery device and to deliver the product to a person, to a second product delivery device, and/or the like. The requestor may initiate the order via the requestor user device where the requestor specifies the product that needs to be picked up from the product delivery device. The facilitation platform may facilitate pick-up of the product at the product delivery device and delivery of the product to a drop-off location by the service agent.

As a specific example of a kiosk scenario, a customer of a financial institution may deposit cash, a check, and/or the like into a kiosk, where a service agent may collect the cash, the check, and/or the like via pairing and/or authentication processes similar to that described elsewhere herein. In this case, the service agent may bring the cash, the check, and/or the like to an ATM, a bank, a drop box, and/or the like. While these implementations may apply to a scenario that is different than that described elsewhere herein, the implementations may be performed in a similar manner.

As indicated above, FIGS. 1A-1D are provided merely as examples. Other examples are possible and may differ from what was described with regard to FIGS. 1A-1D.

Figure 2:
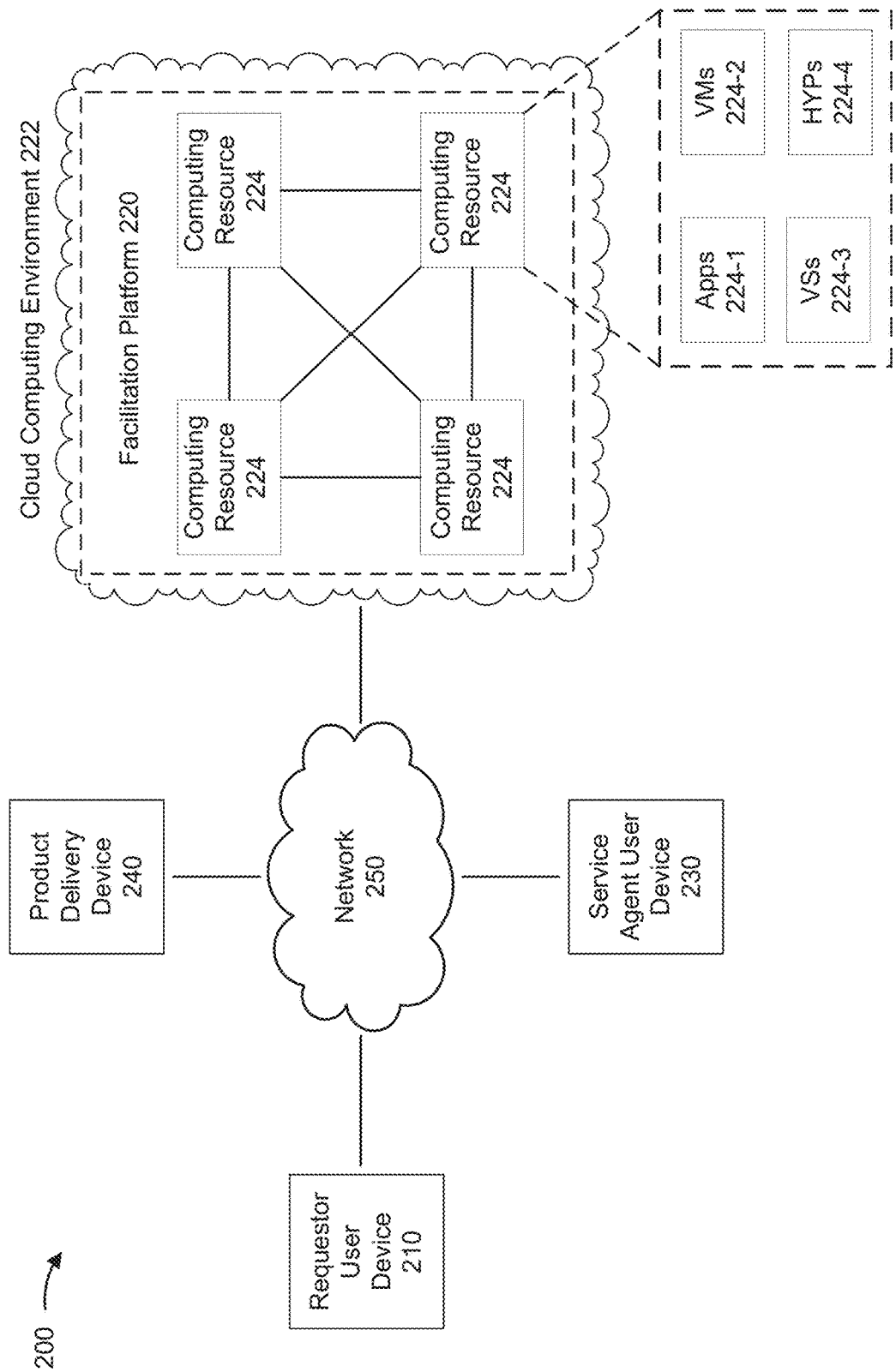
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, example environment 200 may include a requestor user device 210, a facilitation platform 220, a service agent user device 230, a product delivery device 240, and a network 250. Devices of example environment 200 may interconnect via wired connections, wireless connections, or a combination of wired and wireless connections.

Requestor user device 210 includes one or more devices capable of receiving, generating, storing, processing, and/or providing information associated with ordering a product. For example, requestor user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, requestor user device 210 may include hardware or a combination of hardware and software for determining a geographic location associated with requestor user device 210 (e.g., a global positioning system (GPS) sensor, Wi-Fi radio, Bluetooth radio, mapping application, or the like). In some implementations, requestor user device 210 may include one or more applications to order a product, such as a peer-to-peer application to facilitate delivery of a product that can be picked up at a product delivery device 240 or delivered by a service agent associated with service agent user device 230.

Facilitation platform 220 includes one or more devices capable of receiving, generating, storing, processing, and/or providing information associated with facilitating delivery of a product. For example, facilitation platform 220 may include a cloud server or a group of cloud servers. In some implementations, facilitation platform 220 may be designed to be modular such that certain software components can be swapped in or out depending on a particular need. As such, facilitation platform 220 may be easily and/or quickly reconfigured for different uses.

In some implementations, as shown, facilitation platform 220 may be hosted in cloud computing environment 222. Notably, while implementations described herein describe facilitation platform 220 as being hosted in cloud computing environment 222, in some implementations, facilitation platform 220 may not be cloud-based (i.e., may be implemented outside of a cloud computing environment) or may be partially cloud-based.

Cloud computing environment 222 includes an environment that hosts facilitation platform 220. Cloud computing environment 222 may provide computation, software, data access, storage, and/or other services that do not require end-user knowledge of a physical location and configuration of a system and/or a device that hosts facilitation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or another type of computation and/or communication device. In some implementations, computing resource 224 may host facilitation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, one or more virtualized storages ("VSs") 224-3, or one or more hypervisors ("HYPs") 224-4.

Application 224-1 includes one or more software applications that may be provided to or accessed by one or more devices of example environment 200. Application 224-1 may eliminate a need to install and execute the software applications on devices of example environment 200. For example, application 224-1 may include software associated with facilitation platform 220 and/or any other software capable of being provided via cloud computing environment 222. In some implementations, one application 224-1 may send/receive information to/from one or more other applications 224-1, via virtual machine 224-2. In some implementations, application 224-1 may include a software application associated with one or more databases and/or operating systems. For example, application 224-1 may include an enterprise application, a functional application, an analytics application, and/or the like.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of requestor user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Service agent user device 230 includes one or more devices capable of receiving, generating, storing, processing, and/or providing information associated with ordering a product. In some implementations, service agent user device 230 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, service agent user device 230 may include hardware or a combination of hardware and software for determining a geographic location associated with service agent user device 230 (e.g., GPS sensor, Wi-Fi radio, Bluetooth radio, mapping application, or the like). In some implementations, service agent user device 230 may include one or more applications to facilitate location-based transactions, such as a peer-to-peer transaction application to facilitate transactions involving products and/or services that can be requested by users, e.g., a user of requestor user device 210.

Product delivery device 240 includes a physical device capable of housing and dispensing products. For example, product delivery device 240 may include a locker, a lock box, an ATM, a kiosk, a safe, a vending machine, or any other type of secured device for housing and releasing a product. In some implementations, product delivery device 240 may include one or more devices capable of performing various types of financial transactions, such as a cash withdrawal, a money deposit (e.g., a check or cash deposit), a money transfer (e.g., a transfer from one bank account to another bank account), access to information related to an account (e.g., a bank account, a checking account, a credit card account, etc.), and/or the like. For example, product delivery device 240 may include an automated banking machine (ABM), a cash point, a Cashline®, a Minibank®, a cash machine, a Tyme® machine, a cash dispenser, a Bankomat®, a Bancomat®, and/or a similar type of device.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
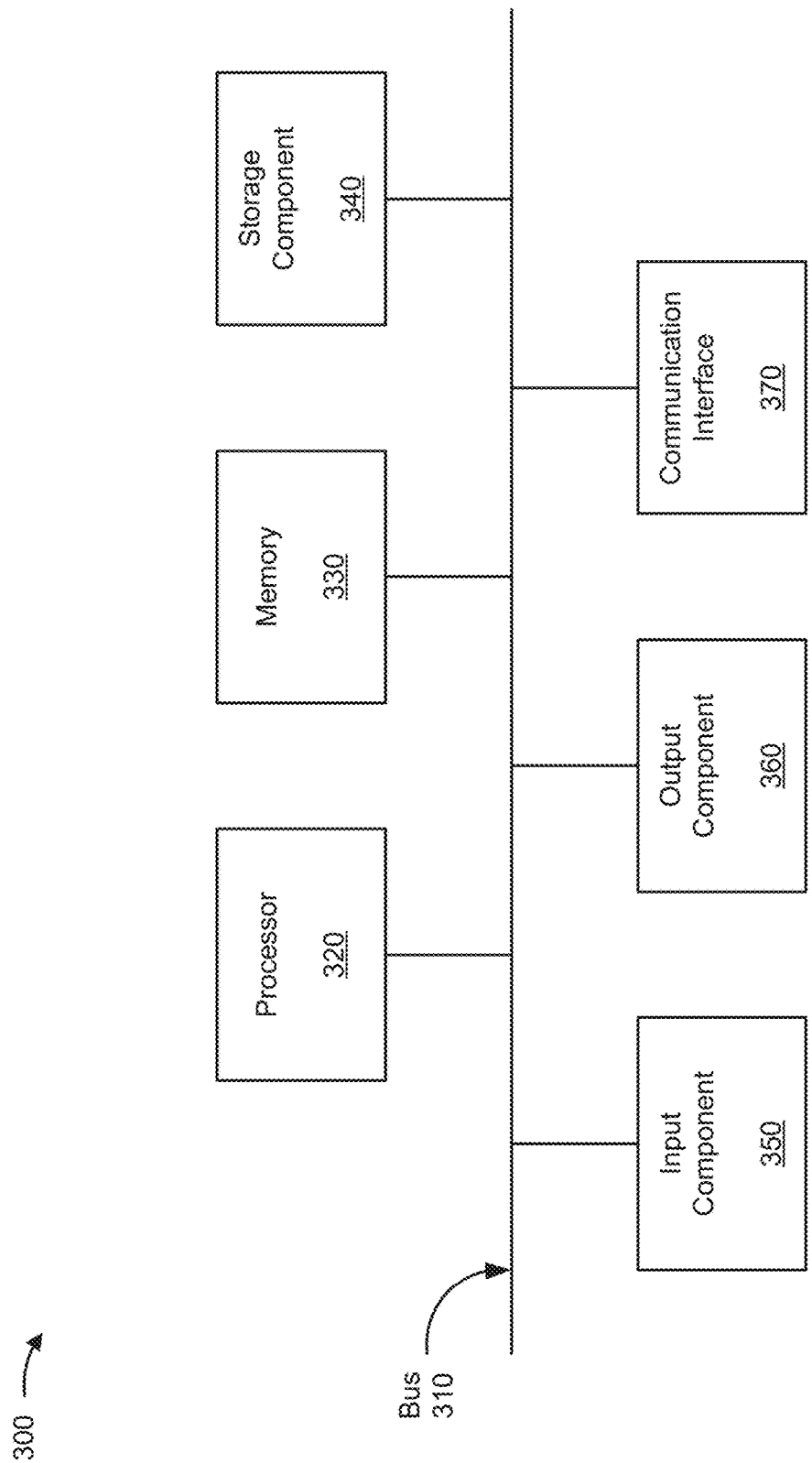
FIG. 3 is a diagram of example components of one or more devices of FIG. 2.

FIG. 3 is a diagram of example components of a device 300. Device 300 may correspond to requestor user device 210, facilitation platform 220, service agent user device 230, and/or product delivery device 240. In some implementations, requestor user device 210, facilitation platform 220, service agent user device 230, and/or product delivery device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a GPS component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
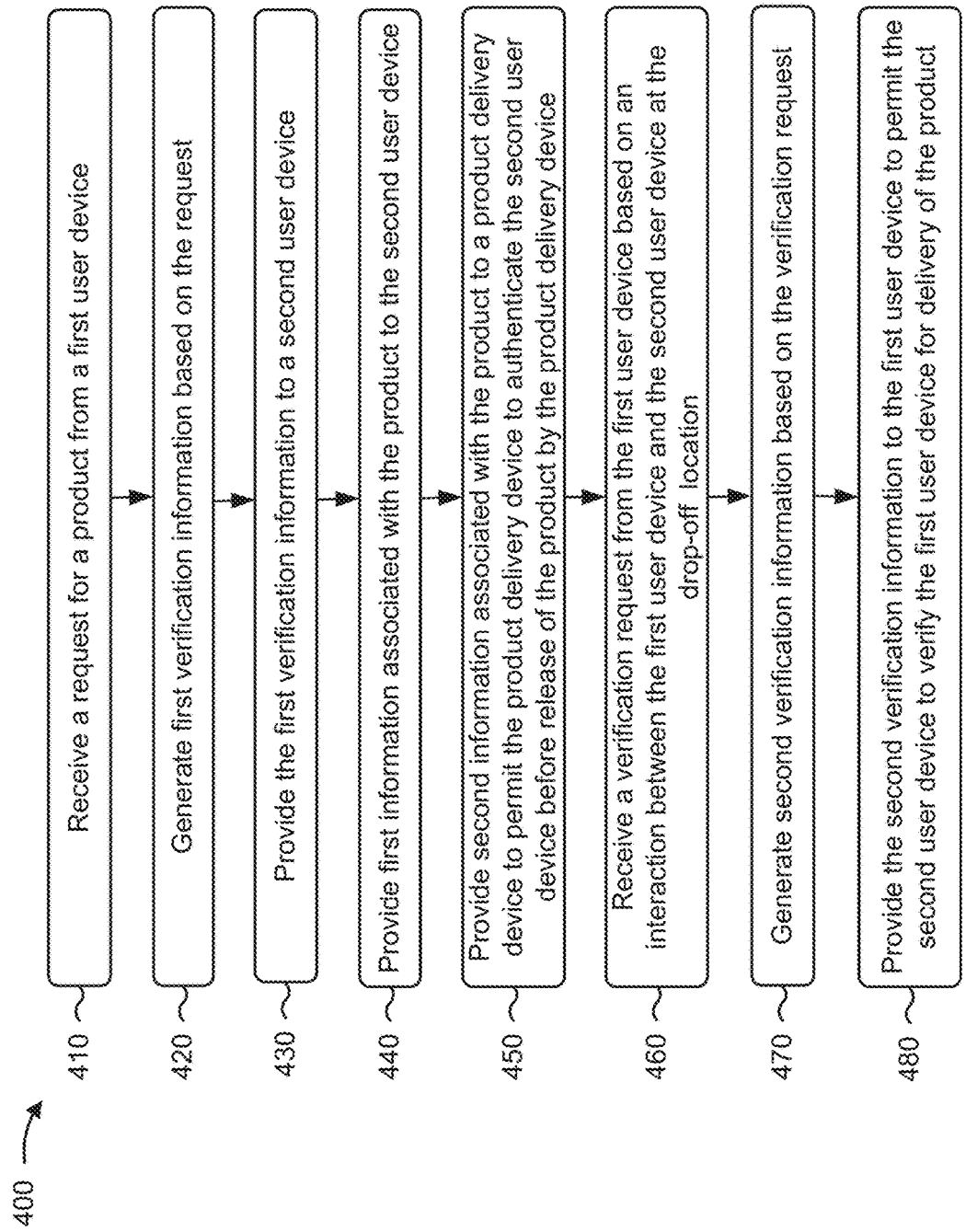
FIG. 4 is a flow chart of an example process for facilitating delivery of a product.

FIG. 4 is a flow chart of an example process 400 for facilitating delivery of a product. In some implementations, one or more process blocks of FIG. 4 may be performed by a facilitation platform 220. In some implementations, one or more process blocks of FIG. 4 may be performed by another device or a group of devices separate from or including facilitation platform 220, such as requestor user device 210, service agent user device 230, and product delivery device 240.

As shown in FIG. 4, process 400 may include receiving a request for a product from a first user device (block 410). For example, facilitation platform 220 (e.g., using computing resource 224, processor 320, memory 330, input component 350, communication interface 370, and/or the like) may receive a request for a product from requestor user device 210 (e.g., a first user device), as described above in connection with FIGS. 1A-2.

As shown in FIG. 4, process 400 may include generating first verification information based on the request (block 420). For example, facilitation platform 220 (e.g., using computing resource 224, processor 320, memory 330, input component 350, communication interface 370, and/or the like) may generate first verification information (which may include, e.g., an authentication credential for release of the product) based on the request, as described above in connection with FIGS. 1A-2.

As shown in FIG. 4, process 400 may include providing the first verification information to a second user device (block 430). For example, facilitation platform 220 (e.g., using computing resource 224, processor 320, memory 330, input component 350, communication interface 370, and/or the like) may provide the first verification information to a service agent user device 230 (e.g., the second user device), as described above in connection with FIGS. 1A-2.

As shown in FIG. 4, process 400 may include providing first information associated with the product to the second user device (block 440). For example, facilitation platform 220 (e.g., using computing resource 224, processor 320, memory 330, input component 350, communication interface 370, and/or the like) may provide transaction information (e.g., the first information) to the service agent user device 230 (e.g., the second user device), as described above in connection with FIGS. 1A-2. In some implementations, the first information may include location information corresponding to a pick-up location at which the product is to be acquired and a drop-off location at which the product is to be delivered. In some implementations, the first information may include location information corresponding to a product location at which the product is to be acquired.

As shown in FIG. 4, process 400 may include providing second information associated with the product to a product delivery device to permit the product delivery device to authenticate the second user device before release of the product by the product delivery device (block 450). For example, facilitation platform 220 (e.g., using computing resource 224, processor 320, memory 330, input component 350, communication interface 370, and/or the like) may provide product release information (e.g., second information associated with the product) to a product delivery device 240 to permit the product delivery device 240 to authenticate the service agent user device 230 (e.g., the second user device) before release of the product by the product delivery device 240, as described above in connection with FIGS. 1A-2.

As shown in FIG. 4, process 400 may include receiving a verification request from the first user device based on an interaction between the first user device and the second user device at the drop-off location (block 460). For example, facilitation platform 220 (e.g., using computing resource 224, processor 320, memory 330, input component 350, communication interface 370, and/or the like) may receive a verification request from the requestor user device 210 (e.g., the first user device) based on an interaction between the requestor user device 210 (e.g., the first user device) and the service agent user device 230 (e.g., the second user device) at the drop-off location, as described above in connection with FIGS. 1A-2.

As shown in FIG. 4, process 400 may include generating second verification information based on the verification request (block 470). For example, facilitation platform 220 (e.g., using computing resource 224, processor 320, memory 330, input component 350, communication interface 370, and/or the like) may generate second verification information based on the verification request, as described above in connection with FIGS. 1A-2.

As shown in FIG. 4, process 400 may include providing the second verification information to the first user device to permit the second user device to verify the first user device for delivery of the product (block 480). For example, facilitation platform 220 (e.g., using computing resource 224, processor 320, memory 330, input component 350, communication interface 370, and/or the like) may provide the second verification information to the requestor user device 210 (e.g., the first user device) to permit the service agent user device 230 (e.g., the second user device) to verify the requestor user device 210 (e.g., the first user device) for delivery of the product, as described above in connection with FIGS. 1A-2.

Process 400 may include additional implementations, such as any single implementation or any combination of implementations described below and/or described with regard to any other process described herein.

In some implementations, the facilitation platform 220 may receive third information from the product delivery device regarding a creation and/or release status of the product, and may provide, to the first user device and based on the third information, information concerning the creation and/or release status of the product.

In some implementations, the facilitation platform 220 may receive third information from the product delivery device regarding authentication of the second user device, and may provide, to the first user device and based on the third information, update information regarding authentication of the second user device by the product delivery device. In some implementations, the third information may include information identifying one or more characteristics of the second user device, and authentication data related to the first verification information.

In some implementations, the facilitation platform 220 may determine the pick-up location and drop-off location based on the request.

In some implementations, the verification request may include first data indicating a first location associated with the first user device; second data indicating a second location associated with the second user device; and authentication information, associated with the second user device, received during the interaction between the first user device and the second user device. In some implementations, the facilitation platform 220, when generating the second verification information, may generate the second verification information based on the first data, the second data, and the authentication information.

In some implementations, the facilitation platform 220 may receive third information from the first user device that indicates that acceptance of the product was successful, may receive fourth information from the second user device that indicates that delivery of the product was successful, and may provide fifth information to the first user device and the second user device to indicate completion of delivery of the product.

In some implementations, the facilitation platform 220 may generate a verification token based on the verification request, and provide the verification token to the first user device to permit the second user device to verify the first user device, based on obtaining the verification token from the first user device, for delivery of the product. In some implementations, the facilitation platform 220 may receive a notification regarding a first location associated with the second user device, and may determine that the first location is within a threshold distance of the pick-up location based on the notification.

In some implementations, the facilitation platform 220 may receive a first notification regarding a first location associated with the first user device, may receive a second notification regarding a second location associated with the second user device, and may determine that the first location and the second location, based on the first notification and the second notification, are within a threshold distance of the drop-off location, wherein the verification token is provided to the first user device based on the first location and the second location being within the threshold distance of the drop-off location.

In some implementations, the facilitation platform 220, when generating the verification token, may generate a quick response (QR) code, using one or more characteristics of the verification request, as the verification token. In some implementations, the facilitation platform 220, when generating the verification token, may generate a bar code and/or identification string, using one or more characteristics of the verification request, as the verification token.

In some implementations, the verification request may include first data, associated with the second user device, received during the interaction between the first user device and the second user device, and second data related to identification of an operator of second user device.

In some implementations, the facilitation platform 220 may receive third information from the product delivery device regarding authentication of second user device and release of the product by the product delivery device. In some implementations, the facilitation platform 220 may provide, fourth information to the first user device and the second user device, where the fourth information includes location information corresponding to a drop-off location at which the product is to be delivered. In some implementations, the facilitation platform 220 may receive a first verification request from the first user device based on an interaction between the first user device and second user device at the drop-off location. In some implementations, the facilitation platform 220 may receive a second verification request from the second user device based on the interaction between the first user device and the second user device at the drop-off location. In some implementations, the facilitation platform 220 may provide a first verification signal to the first user device and a second verification signal to the second user device to permit delivery of the product.

In some implementations, the first verification signal and the second verification signal each indicates that the first user device and the second user device were successfully authenticated.

In some implementations, the first verification signal includes first identification information associated with the second user device, and the second verification signal includes second identification information associated with the first user device. In some implementations, the facilitation platform 220 may receive an authentication signal from the first user device indicating that the first user device authenticated the second user device based on the first identification information. In some implementations, the facilitation platform 220 may receive an authentication signal from the second user device indicating that the second user device authenticated the first user device based on the second identification information.

In some implementations, the facilitation platform 220 may receive a notification of a first location associated with the second user device, and may provide information related to the first location to the first user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
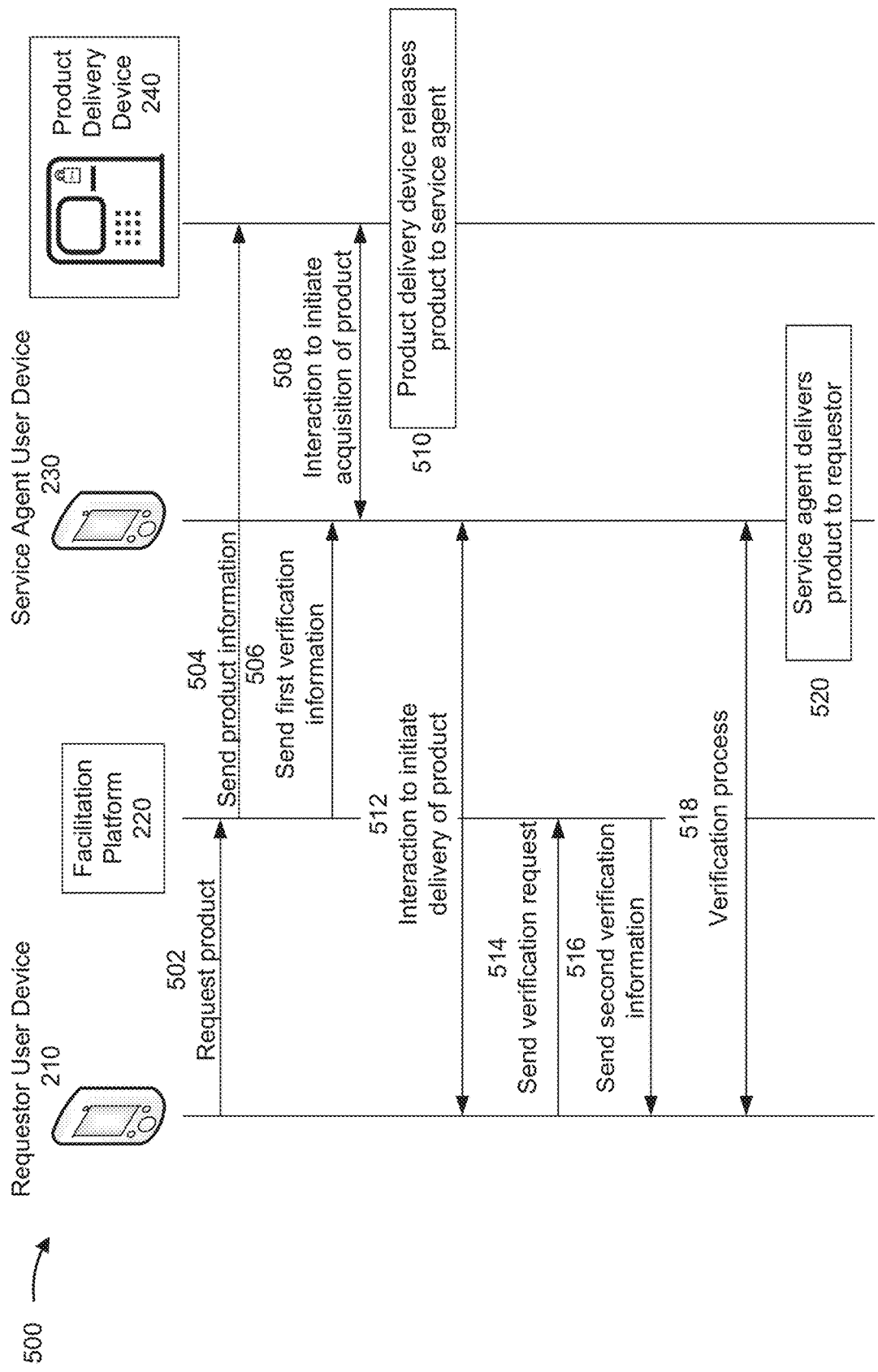
FIG. 5 is a call flow diagram of an example call flow for facilitating delivery of a product according to the example process shown in FIG. 4.

FIG. 5 is a call flow diagram of an example call flow 500 for facilitating delivery of a product. FIG. 5 shows an example of interaction among requestor user device 210, facilitation platform 220, service agent user device 230, and product delivery device 240, such as may occur when a requestor requests a product for delivery by a service agent. In some implementations, requestor user device 210, facilitation platform 220, service agent user device 230, and product delivery device 240 may interact in a manner that is the same as or similar to that described above with respect to FIGS. 1A-1D, and/or for purposes and/or objectives that are the same as or similar to those described above with respect to FIGS. 1A-1D.

As shown in FIG. 5, and by reference number 502, the requestor user device 210 may provide a product request to the facilitation platform 220. As shown by reference number 504, based on the request, the facilitation platform 220 may send product information to the product delivery device 240. As shown by reference number 506, based on the request, the facilitation platform 220 may send first verification information to the service agent user device 230. As shown by reference number 508, based on receiving the first verification information, the service agent user device 230 may interact with the product delivery device 240 to initiate acquisition of the product. As shown by reference number 510, based on receiving the product information and interacting with the service agent user device 230 to initiate acquisition of the product, the product delivery device 240 may release the product to the service agent.

As further shown in FIG. 5, and by reference number 512, the service agent user device 230 may interact with requestor user device 210 to initiate delivery of the product. As shown by reference number 514, based on the interaction with the service agent user device 230, the requestor user device 210 sends a verification request to the facilitation platform 220. As shown by reference number 516, based on the verification request, the facilitation platform 220 sends second verification information to the requestor user device 210. As shown by reference number 518, based on receiving the second verification information, the requestor user device 210 interacts with service agent user device 230 to perform a verification process. As shown by reference number 520, based on the verification process, the service agent delivers the product to the requestor.

As indicated above, FIG. 5 is provided merely as an example. Other examples are possible and may differ from what was described with regard to FIG. 5.

Figure 6:
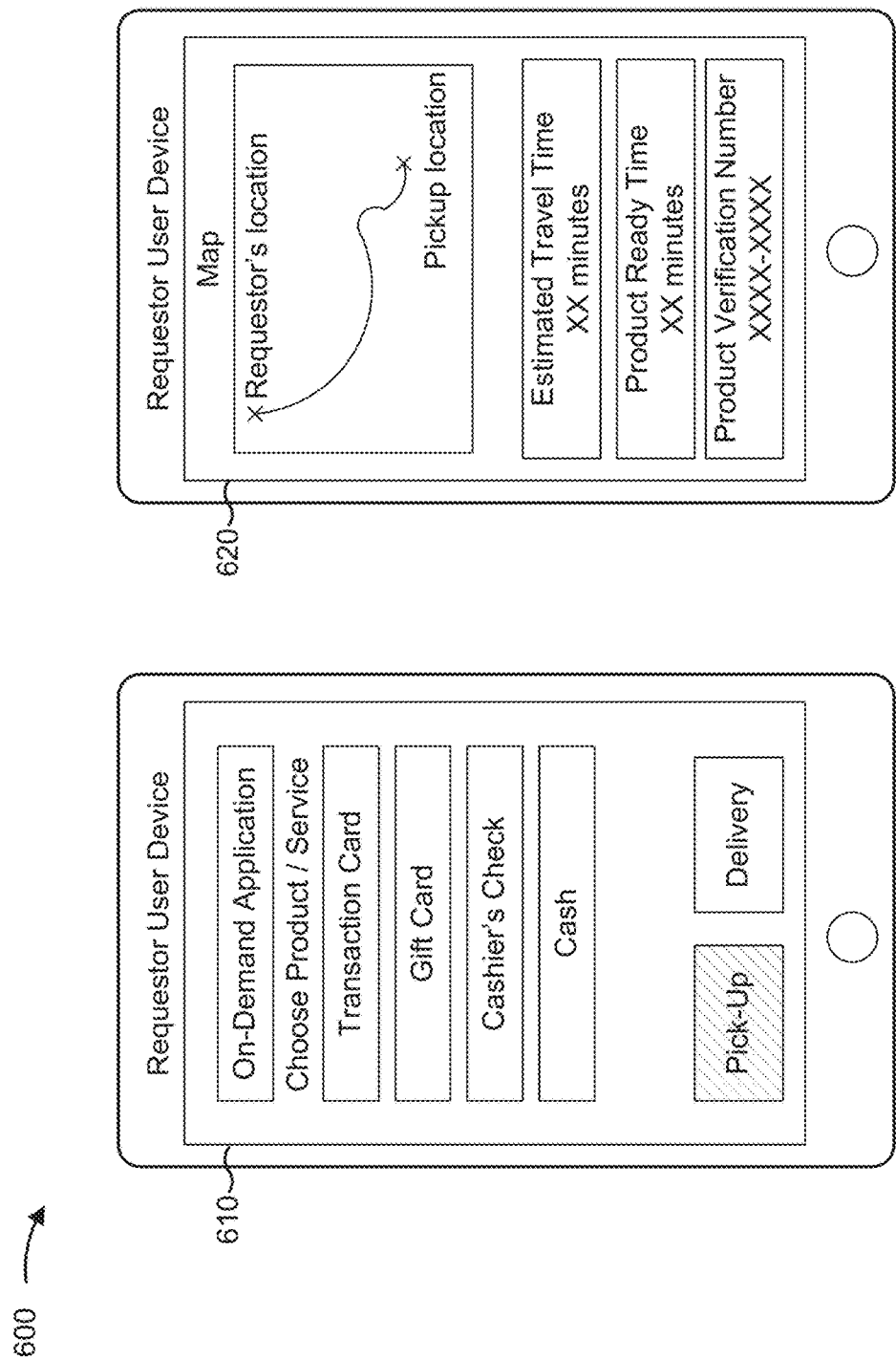
FIG. 6 is a diagram of an example implementation relating to an example implementation shown in FIGS. 1A-1D.

FIG. 6 is a diagram of an example implementation 600 relating to example implementation 100 shown in FIG. 1A. FIG. 6 shows example user interfaces of a product ordering application that may operate on requestor user device 210 that may be used to communicate with facilitation platform 220.

As shown in FIG. 6, requestor user device 210 may include a user interface 610 that displays a menu of options for ordering a product (e.g., a transaction card, gift card, cashier's check, or cash, as shown). In this case, as shown, a "Pick-Up" button has been selected by the requestor, which may initiate a request to pick up the selected product. As further shown in FIG. 6, requestor user device 210 may include a user interface 620 that displays a map showing a location of the requestor, a pick-up location (e.g., a location of product delivery device 240 where the requestor may pick up the product), and a route from the requestor to the pick-up location. Additionally, as shown, user interface 620 may display an estimated travel time from the location of the requestor to the pick-up location, a product ready time indicating a time at which the product is expected to be ready for pick-up, and a product verification number (e.g., an identification number, a bar code, and/or the like) that the requestor may use to verify pick up of the product.

Accordingly, the example user interfaces of example implementation 600, which may operate on requestor user device 210 and may be used to communicate with facilitation platform 220, may be used to order pick-up of a product, as described herein.

As indicated above, FIG. 6 is provided merely as an example. Other examples are possible and may differ from what was described with regard to FIG. 6.

Figure 7:
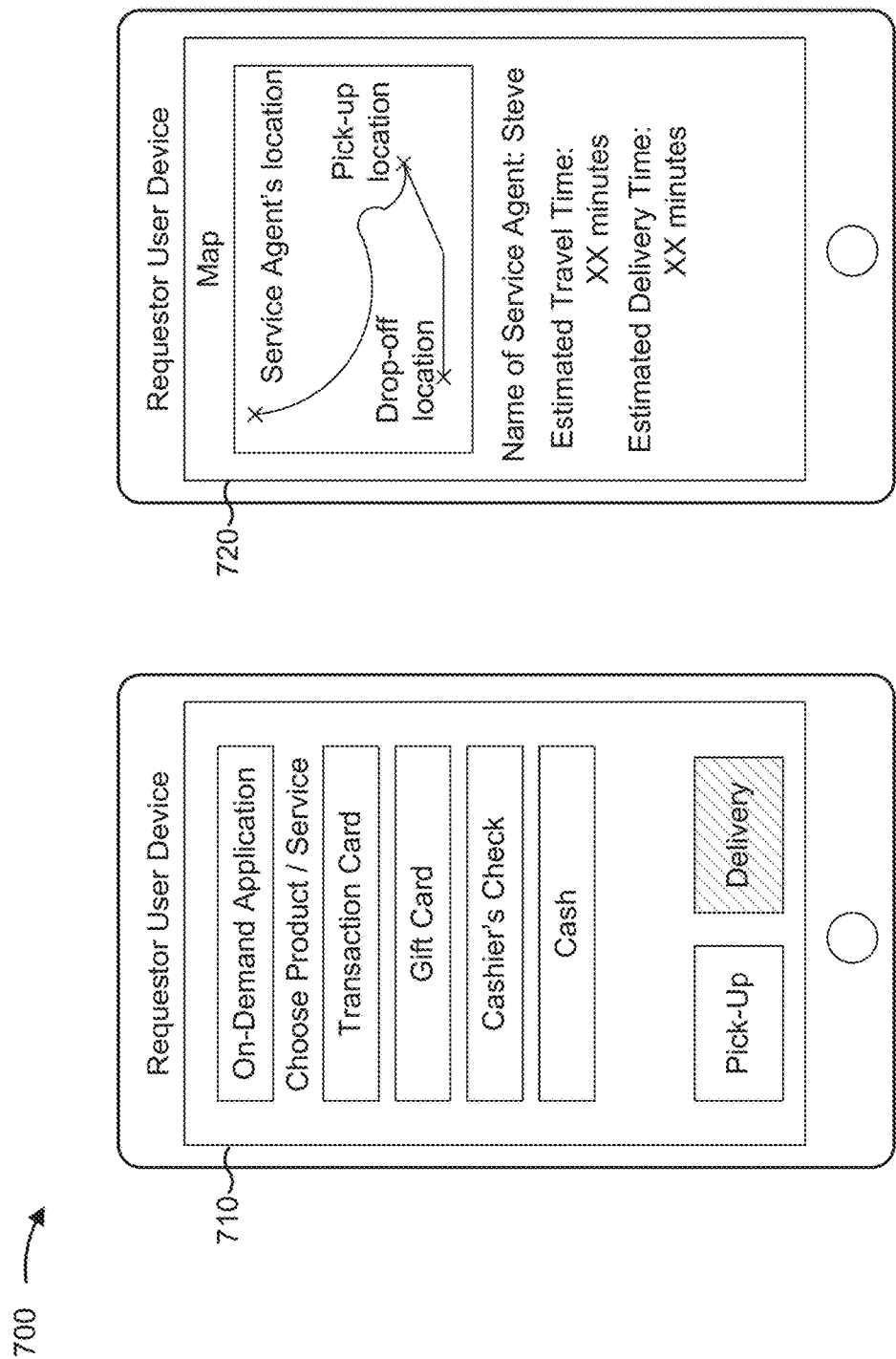
FIG. 7 is a diagram of an example implementation relating to an example implementation shown in FIGS. 1A-1D.

FIG. 7 is a diagram of an example implementation 700 relating to example implementation 100 shown in FIGS. 1B-1D. FIG. 7 shows example user interfaces of a product ordering application that may operate on requestor user device 210 that may be used to communicate with facilitation platform 220.

As shown in FIG. 7, requestor user device 210 may include a user interface 710 that displays a menu of options for ordering a product (e.g., a transaction card, gift card, cashier's check, or cash, as shown). In this case, as shown, a "Delivery" button has been selected by the requestor, which may initiate a request to deliver the selected product. As further shown in FIG. 7, requestor user device 210 may include a user interface 720 that displays a map showing a location of the service agent, a pick-up location (e.g., a location of product delivery device 240 where the service agent may pick up the product), a drop-off location (e.g., a location where the service agent may meet the requestor to drop off the product to the requestor, such as a home or business of the requestor, a secure location selected by the requestor or agreed upon by the requestor and/or service agent, and/or the like), a path from the service agent location to the pick-up location, and a path from the pick-up location to the drop-off location. Additionally, as shown, user interface 720 may display an estimated travel time from the location of the service agent to the pick-up location, and an estimated travel time from the pick-up location to the drop-off location.

Accordingly, the example user interfaces of example implementation 700, which may operate on requestor user device 210 and may be used to communicate with facilitation platform 220, may be used to order delivery of a product, as described herein.

As indicated above, FIG. 7 is provided merely as an example. Other examples are possible and may differ from what was described with regard to FIG. 7.

Some implementations, described herein, provide a facilitation platform 220 that is capable of receiving and processing orders and enabling delivery of a product order in a time-efficient and secure manner. For example, a consumer orders a product via requestor user device 210 and facilitation platform 220 processes the order, determines a pick-up location, and ensures that the consumer is able to acquire the product at product delivery device 240. In another example, a consumer orders for delivery of a product via a requestor user device 210. The facilitation platform 220 processes the order, enlists a service agent, determines a pick-up location, and ensures the service agent is able to acquire the product at product delivery device 240. The facilitation platform 220 also determines a drop-off location and ensures that the consumer is able to acquire the product from the service agent.

In this way, the facilitation platform 220 improves the process for ordering and delivering a security-sensitive product. By automating the ordering, authentication, creation, and delivery steps of the facilitating process, waste can be avoided and the requestor can receive the product in a manner and at a time that is convenient for the consumer. Because security measures are used in some implementations herein, fraudulent activity, resulting in lost funds, unnecessary use of computing resources, and/or the like may be avoided. Further, automating the facilitating process conserves computing resources (e.g., processor resources, memory resources, and/or the like) that would otherwise be wasted performing an inefficient and/or time consuming manually driven process.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device, a request for a product from a user device;
 identifying, by the device, a product delivery device based on one or more factors associated with the product delivery device, the one or more factors including:
  a geographic location associated with the product delivery device,
  an ability of the product delivery device to create the product, and
  a capability of the product delivery device to provide a particular security feature associated with delivery of the product;
 providing, by the device and to the product delivery device, first information associated with the particular security feature; and
 providing, by the device and to the product delivery device, second information associated with the product to cause the product delivery device to create the product.

2. The method of claim 1, wherein the particular security feature comprises a method of enabling access to the product at the product delivery device.

3. The method of claim 1, wherein the particular security feature comprises an authentication feature for authenticating a user picking up the product from the product delivery device.

4. The method of claim 1, further comprising:
receiving, by the device, other geographic information indicating a location associated with the user device,
wherein identifying the product delivery device comprises:
identifying the product delivery device, from a plurality of product delivery devices, based on the other geographic information and the geographic location associated with the product delivery device.

5. The method of claim 1, wherein identifying the product delivery device comprises:
identifying the product delivery device using a machine learning model trained to receive the one or more factors as input and provide, as output, a score associated with the product delivery device.

6. The method of claim 1, wherein identifying the product delivery device comprises:
identifying a plurality of product delivery devices;
providing, to the user device, information enabling a user of the user device to select from the plurality of product delivery devices; and
identifying the product delivery device, from the plurality of product delivery devices, based on a user selection of the product delivery device.

7. The method of claim 1, further comprising:
providing, to the user device, verification information enabling pickup of the product from the product delivery device,
the verification information being associated with the first information associated with the particular security feature.

8. A device, comprising:
one or more memories; and
one or more processors communicatively coupled to the one or more memories, configured to:
receive a request for a product from a user device;
identify a product delivery device based on one or more factors associated with the product delivery device, the one or more factors including:
a geographic location associated with the product delivery device,
an ability of the product delivery device to create the product, and
a capability of the product delivery device to provide a particular security feature associated with delivery of the product;
provide, to the product delivery device, first information associated with the particular security feature; and
provide, to the product delivery device, second information associated with the product to cause the product delivery device to create the product.

9. The device of claim 8, wherein the particular security feature comprises a method of enabling access to the product at the product delivery device.

10. The device of claim 8, wherein the particular security feature comprises an authentication feature for authenticating a user picking up the product from the product delivery device.

11. The device of claim 8, wherein the one or more processors are further configured to:
receive, by the device, other geographic information indicating a location associated with the user device,
wherein the one or more processors, when identifying the product delivery device, are configured to:
identify the product delivery device, from a plurality of product delivery devices, based on the other geographic information and the geographic location associated with the product delivery device.

12. The device of claim 8, wherein the one or more processors, when identifying the product delivery device, are configured to:
identify the product delivery device using a machine learning model trained to receive the one or more factors as input and provide, as output, a score associated with the product delivery device.

13. The device of claim 8, wherein the one or more processors, when identifying the product delivery device, are configured to:
identify a plurality of product delivery devices;
provide, to the user device, information enabling a user of the user device to select from the plurality of product delivery devices; and
identify the product delivery device, from the plurality of product delivery devices, based on a user selection of the product delivery device.

14. The device of claim 8, wherein the one or more processors are further configured to:
provide, to the user device, verification information enabling pickup of the product from the product delivery device,
the verification information being associated with the first information associated with the particular security feature.

15. A non-transitory computer-readable medium storing instructions, the instructions comprising:
one or more instructions that, when executed by one or more processors, cause the one or more processors to:
receive a request for a product from a user device;
identify a product delivery device based on one or more factors associated with the product delivery device, the one or more factors including:
a geographic location associated with the product delivery device,
an ability of the product delivery device to create the product, and
a capability of the product delivery device to provide a particular security feature associated with delivery of the product;
provide, to the product delivery device, first information associated with the particular security feature; and
provide, to the product delivery device, second information associated with the product to cause the product delivery device to create the product.

16. The non-transitory computer-readable medium of claim 15, wherein the particular security feature comprises a method of enabling access to the product at the product delivery device.

17. The non-transitory computer-readable medium of claim 15, wherein the particular security feature comprises an authentication feature for authenticating a user picking up the product from the product delivery device.

18. The non-transitory computer-readable medium of claim 15, wherein the one or more instructions, when executed by the one or more processors, further cause the one or more processors to:
    receive other geographic information indicating a location associated with the user device,
    wherein the one or more instructions, that cause the one or more processors to identify the product delivery device, cause the one or more processors to:
        identify the product delivery device, from a plurality of product delivery devices, based on the other geographic information and the geographic location associated with the product delivery device.

19. The non-transitory computer-readable medium of claim 15, wherein the one or more instructions, that cause the one or more processors to identify the product delivery device, cause the one or more processors to:
    identify the product delivery device using a machine learning model trained to receive the one or more factors as input and provide, as output, a score associated with the product delivery device.

20. The non-transitory computer-readable medium of claim 15, wherein the one or more instructions, that cause the one or more processors to identify the product delivery device, cause the one or more processors to:
    identify a plurality of product delivery devices;
    provide, to the user device, information enabling a user of the user device to select from the plurality of product delivery devices; and
    identify the product delivery device, from the plurality of product delivery devices, based on a user selection of the product delivery device.

* * * * *